Jan. 7, 1969  B. T. HENSGEN  3,420,209
APPARATUS FOR APPLYING A POWDERED RELEASE
AGENT WHILE CUTTING STOCK
Filed July 25, 1966
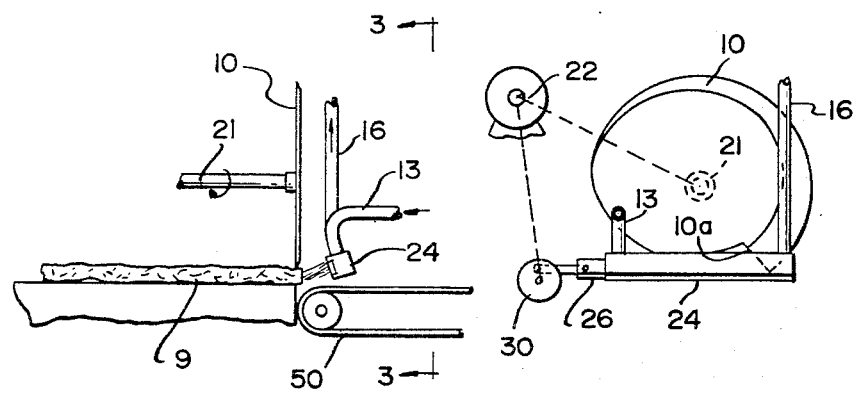
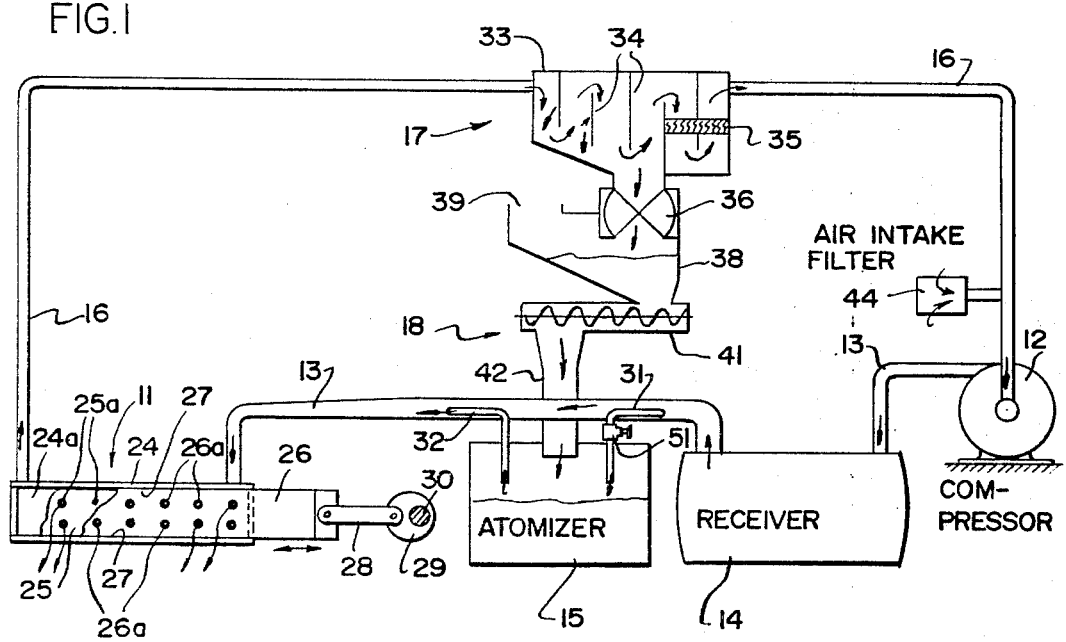
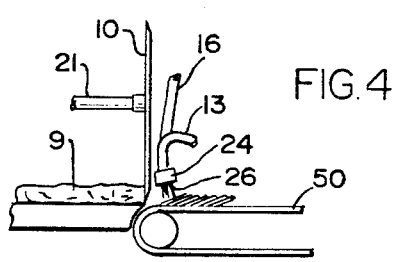
INVENTOR
BERNARD T. HENSGEN
BY Hofgren, Wegner, Allen,
Stellman & McCord
ATTORNEYS

United States Patent Office

3,420,209
Patented Jan. 7, 1969

3,420,209
APPARATUS FOR APPLYING POWDERED RELEASE AGENT WHILE CUTTING STOCK
Bernard T. Hensgen, Highland Park, Ill., assignor to B. T. Hensgen, Inc., a corporation of Illinois
Filed July 25, 1966, Ser. No. 567,707
U.S. Cl. 118—15      6 Claims
Int. Cl. B26d 7/00

ABSTRACT OF THE DISCLOSURE

A system for coating and applying a powdered release agent to the cut surface of a plastic material such as bacon where the plastic material is sliced while supported at a cutting station with a powder applicator valve facing the freshly cut surface. The device includes a chamber supplying fluidized powder through the valve and includes a cyclic conduit for delivering powder through the chamber, thence to a trap which is in an enlargement in the conduit and contains baffles and a filter for separating the powdered material from the fluidizing medium and the fluidizing medium continues through the conduit, a compressor, and a receiver for return to the valve chamber. Between the receiver and valve chamber a stream of the fluidizing medium is diverted into an atomizer and returned to fluidize and pick up more release agent which is delivered back to the conduit with the remainder of the fluidizing medium passing through the conduit creating a venturi effect to assist in introduction of the release powder into the conduit. The release powder separated from the fluidizing medium at the trap is delivered through a pressure valve to a collector from which it is removed and delivered to the atomizer. The collector includes a refill port for adding release powder to the system.

---

This invention relates to a system for coating an exposed surface of a plastic stock with a release or separating agent. More particularly the invention relates to a system which is useful in combination with a highspeed cutting operation in which slices are cut from the plastic stock as the plastic stock is fed to a cycling cutting blade, and the system is employed to coat an exposed surface of the stock with the release agent during each cutting cycle of the blade such that each slice cut from the stock has a coating of release agent applied to one face.

It is often desirable to provide a release coating between slices of plastic stock so that the slices are readily separable from each other. For example, bacon is commonly supplied to retailers in presliced or shingled form to fit an elongated package. However, when it is desired to use the bacon slices, they are difficult to separate since they tend to adhere one to the other, especially after the package has been placed in a refrigerator for a period of time. As a result, the individual slices tend to break up when attempts are made to pull them free of one another. A solution to this problem has been to coat the slices on at least one surface with a release agent that will permit easier separation of the slices. The present invention provides a new system capable of applying such coating during slicing of the bacon.

It is a general object of this invention to provide a new and useful system for coating an exposed face of plastic stock.

Another object of this invention is to provide a coating system which is capable of cycling at a high rate of speed to coat the surface of each slice between each cutting stroke of a high-speed cutting operation.

Still another object of this invention is to provide a coating system in which the coating material, powder or liquid, is applied in an atomized state and excess coating material is recovered for reuse.

Yet another object of this invention is to provide a coating system in which a cyclic stream of air is maintained for supplying the coating material to the plastic stock and for recycling excess coating material to a separation system for separating the excess coating material from the stream of air; a further object is to provide a system according to the foregoing object in which the recovered excess coating material can be returned to the cyclic stream of air upstream from a coating station where the plastic stock is coated.

Still another object is to provide a system according to any of the foregoing objects which is synchronized with the operation of a cutting blade.

A more particular object is to provide a new and useful valving system for applying atomized coating material to the plastic stock and which can be synchronized with the operation of the cutting blade.

Other objects will be apparent from the following description and the drawings in which:

FIGURE 1 is a schematic illustration of a form of apparatus according to the present invention;

FIGURE 2 is a fragmentary side view of a cutting system employing the apparatus of FIGURE 1 and showing the association between the cutting blade, bar of plastic stock and a coating application valve for coating the freshly cut surface of the bar of plastic stock;

FIGURE 3 is a fragmentary view along line 3—3 of FIGURE 2; and

FIGURE 4 is a fragmentary side view of a cutting system employing an apparatus basically the same as in FIGURE 1 but disposed to coat the freshly cut surface of a slice of stock.

While this invention is susceptible of embodiment in many different forms, there is shown in the drawings and will herein be described in detail a specific embodiment of the invention with the understanding that the present disclosure is to be considered as an exemplification of the principles of the invention and is not intended to limit the invention to the embodiment illustrated.

The illustrated system is especially adapted for applying a powdered release agent, such as carboxymethyl cellulose gum. Where it is desired to use a liquid release agent, slight revision in certain portions of the system may be advantageous as to adapt the system to more effectively handle liquids.

Referring to FIGURES 1–3, the illustrated form of apparatus generally includes a cutting blade 10 for cutting a bar 9 of plastic material which is supported on a suitable support surface. A spray valving system 11 is mounted to face the end of the bar of plastic stock material such as bacon slab 9 for applying atomized release agent or separating agent to the exposed face of the bacon slab 9. A compressor 12 supplies air through an air line 13 and air receiver 14 to the spray valving system 11 and picks up fluidized release agent from atomizer 15 and carries the release agent through valving system 11. A recycle line 16 is provided for recycling excess fluidized release agent from the outlet of valving system 11 to a release agent recovery system 17 which removes release agent from the stream of air. The recovered release agent is returned through a release agent return system 18 to atomizer 15.

More particularly with reference to the figures, blade 10 is secured to shaft 21 and driven counterclockwise as viewed in FIGURE 3 by motor 22.

The spray valving system 11 comprises a housing 24 defining a valve chamber 24a having a wall 25 including ports 25a. A plate 26 is slidably mounted at 27 against wall 25 and includes ports 26a which register with ports 25a in the position shown in FIGURE 1. A link 28 is pivotally connected to the end of plate 26 and to an eccentric crank 29, secured to shaft 30 which is driven by motor 22. Shafts 30 and 21 are synchronized and driven at a ratio of 1:1. As eccentric crank 29 is rotated, plate 26 is slid to the right from its position in FIGURE 1 so that ports 26a are out of registry with ports 25a, thereby blocking flow from chamber 24a through the ports. Each time plate 26 is returned to the position shown in FIGURE 1, the ports are in registry, and atomized release agent flowing through chamber 24a is ejected through the aligned ports and onto the edge of slab 9. The drive of shafts 21 and 30 from motor 22 is synchronized such that ports 26a and 25a come into registry just as trailing edge 10a of blade 10 has passed through slab 9 as blade 10 completes each cutting stroke, e.g., in about the position shown in FIGURE 3.

The atomized release agent is supplied to the cyclic stream of air from atomizer 15 which has an inlet tube 31 equipped with throttling needle valve 51 for diverting a portion of the air stream into the atomizer and controlling the portion so directed so as to regulate the amount of material to be fluidized in the air stream. An outlet tube 32 provides a venturi nozzle in combination with line 13, so that air in line 13 rushing by the outlet end of tube 32 draws the atomized material from atomizer 15 into the cyclic stream of air in line 13 to supply the atomized material to the spray valving system 11. Where liquid release agent is used, the atomizer can be equipped with a suitable vaporizer.

After the atomized release agent passes through the spray valving system, the unused fluidized release agent is cycled through line 16 to the release agent recovery system 17 which includes a separator chamber or a trap 33 including a plurality of baffles 34 and a filter 35 arranged such that air and release agent impinging on baffles 34 are slowed, and the release agent falls to the bottom of trap 33 while the air continues to pass through trap 33 and filter 35 for return to compressor 12. Filter 35 removes the remaining or entrained release agent. A rotatable air-lock valve 36 is provided at the bottom of chamber or trap 33 and the recovered release agent is periodically discharged through the air-lock valve 36, either manually or automatically (not shown), into a powder return means bin or hopper 38. The valve 36 rotates to discharge the release agent while maintaining stable pressure in the system. Make-up release agent can be added to hopper 38 as at 39.

The release agent recycle system or powder delivery means 18 includes a spiral conveyor 41 which is continuously driven from motor 22, geared down to a very slow rate of rotation to feed powdered release agent from the bottom outlet of bin 38 to a downwardly directed tube or chute 42 for feeding the release agent to atomizer 15 at a proper rate to maintain a desired level in atomizer 15. The spiral conveyor 41 and material in bin 38 block escape of pressurizing air from atomizer 15 through tube 42 so that valving system 11 is properly supplied with pressurized and atomized material. Where liquid release agent is used, an appropriately restricted conduit can replace conveyor 41.

To use the illustrated apparatus, it is merely necessary to add sufficient powdered release agent material to bin 38, start compressor 12 and start motor 22 to drive the valving system 11, blade 10 and spiral conveyor 41. Compressor 12 draws air in as needed through air-intake filter 44 and cycles the stream of air for picking up the release agent material from atomizer 15 as described above. The bar stock material 9 is fed to the blade 10 in a normal manner and the slices are recovered by falling from the edge of the support surface to a conveyor system 50. Conveyor 50 can be independently driven or can be driven by motor 22, if desired. Each slice will have one surface coated with the release agent such that when the slices are packaged in facing relation with each other, they are readily separable from each other.

Referring now to FIGURE 4, the coating system is disposed to coat the freshly cut surface of each slice of cut bacon on the conveyor 50. The apparatus is the same as that disclosed with reference to FIGURES 1–3 with the exception that the housing 24 is disposed at a different angle, i.e., at an angle with ports 25a and 26a facing the last cut surface of the sliced bacon on conveyor 50. The device is synchronized in generally the same manner as described above; accordingly each time a slice of bacon falls to the fanned configuration of bacon slices on conveyor 50 the ported plate 26 is moved to align ports 26a with ports 25a to spray the atomized release agent on the last cut bacon slice.

I claim:
1. A device for applying a powdered release agent to a freshly cut surface while cutting a plastic stock into a plurality of slices which comprises a cutting station including a support surface for the plastic stock and an operable cutting blade for slicing the plastic stock on said support surface and a pressure flow conduit system for delivering powder to the cutting station including: a source of air under pressure, an atomizer chamber, conduit means establishing fluid communication between said source of air under pressure and said atomizer to atomize powder therein, a valve chamber downstream of said atomizer adjacent said cutting station and having a movable valve means for movement between an open position wherein powder may be released against the freshly cut surface of the plastic and a closed position preventing the release of powder therefrom, conduit means establishing fluid communication between said atomizer and said valve chamber, a separator chamber downstream from said valve chamber, and said separator chamber including baffle means for separating powder from fluidized material from the valve chamber, conduit means establishing fluid communication between said valve chamber and said separator, powder delivery means in pressure seal communication with said atomizer, and pressure retaining means for returning powder from said separator to said powder delivering means.

2. The device of claim 1 wherein said pressure retaining means for returning powder comprises a bin having an inlet for adding makeup powder to said bin and an outlet from said bin for directing powder to said powder delivering means and wherein said separator has an air-lock valve for releasing powder from said separator means into said bin.

3. The device of claim 1 wherein said conduit system includes conduit means returning air from said separator chamber to said source of air under pressure.

4. The device of claim 1 wherein the means for delivering the powder to the atomizer includes a screw conveyor means.

5. The device of claim 4 wherein the means for returning powder from said separator to said powder delivering means includes an air lock valve on said separator chamber.

6. The device of claim 5 including conduit and compressor means for delivering filtered air from said separator chamber to said atomizer chamber as a stream separate from said powder returning means.

(References on following page)

References Cited

UNITED STATES PATENTS

| | | | |
|---|---|---|---|
| 1,070,217 | 8/1913 | Williams et al. | 118—15 |
| 1,203,703 | 11/1916 | Chevalier | 302—22 |
| 1,732,641 | 10/1929 | Coon | 118—312 X |
| 2,303,458 | 12/1942 | Hermann et al. | 118—312 X |
| 2,803,214 | 8/1957 | Hensgen | 118—15 |
| 2,884,895 | 5/1959 | Lopenski et al. | 118—312 X |
| 3,035,540 | 5/1962 | Cohen et al. | 118—15 |

WALTER A. SCHEEL, *Primary Examiner.*

JOHN P. McINTOSH, *Assistant Examiner.*

U.S. Cl. X.R.

118—25, 312